(12) United States Patent
Groenen et al.

(10) Patent No.: US 7,933,064 B2
(45) Date of Patent: Apr. 26, 2011

(54) REFLECTOR FOR AN INFRARED RADIATING ELEMENT

(75) Inventors: Roland Groenen, Kortrijk (BE); Hugo Lievens, Ghent (BE)

(73) Assignee: NV Bekaert SA, Zwevegem (BE)

( * ) Notice: Subject to any disclaimer, the term of this patent is extended or adjusted under 35 U.S.C. 154(b) by 267 days.

(21) Appl. No.: 11/913,893

(22) PCT Filed: May 8, 2006

(86) PCT No.: PCT/EP2006/062112
§ 371 (c)(1),
(2), (4) Date: Nov. 8, 2007

(87) PCT Pub. No.: WO2006/120173
PCT Pub. Date: Nov. 16, 2006

(65) Prior Publication Data
US 2008/0212169 A1 Sep. 4, 2008

(30) Foreign Application Priority Data
May 11, 2005 (EP) .................................... 05103935

(51) Int. Cl.
*F21V 9/04* (2006.01)

(52) U.S. Cl. ........................................ 359/360; 359/359
(58) Field of Classification Search .................. 359/359, 359/360
See application file for complete search history.

(56) References Cited

U.S. PATENT DOCUMENTS

| 3,445,662 A | 5/1969 | Langley |
| 2004/0214023 A1* | 10/2004 | Park et al. ..................... 428/458 |
| 2004/0231873 A1* | 11/2004 | Shimamura et al. ..... 174/35 MS |

FOREIGN PATENT DOCUMENTS
EP 0 336 257 A2 10/1989
* cited by examiner

*Primary Examiner* — Joshua L Pritchett
(74) *Attorney, Agent, or Firm* — Foley & Lardner LLP

(57) ABSTRACT

The invention relates to a reflector for an infrared radiating element. The reflector comprises a metal foil coated with—a first oxide layer deposited on the metal foil; —an infrared reflecting metal layer deposited on said first oxide layer; and—a second oxide layer deposited on said infrared reflecting layer. The first oxide layer is functioning as a diffusion barrier layer and is preventing the diffusion of the metal of the infrared reflecting layer in the substrate. The second oxide layer is functioning as a protective layer for the infrared reflecting layer giving the infrared reflecting layer the required thermal stability.

20 Claims, 1 Drawing Sheet

REFLECTOR FOR AN INFRARED RADIATING ELEMENT

FIELD OF THE INVENTION

The invention relates to a reflector for an infrared radiating element.

BACKGROUND OF THE INVENTION

Reflectors for infrared radiating elements comprising a reflecting metal layer such as a gold layer are known in the art.

Such reflector are for example used for infrared lamps or infrared heaters.

However, a known problem of reflectors comprising gold is their limited thermal stability of the gold layer.

SUMMARY OF THE INVENTION

It is an object of the present invention to provide an improved reflector for an infrared radiating element avoiding the problems of the prior art. It is another object of the invention to provide a reflector for an infrared radiating element having an improved thermal stability so that the reflector can be used at high temperatures without loss of the reflectivity of the reflector.

According to one aspect of the present invention a reflector for an infrared radiating element is provided.

The reflector comprises a metal foil coated with
- a first oxide layer deposited on the metal foil;
- an infrared reflecting metal layer deposited on said first oxide layer; and
- a second oxide layer deposited on said infrared reflecting layer.

The infrared radiation element may for example comprise an infrared lamp or an infrared heater.

The total reflection in the wavelength range between 1000 nm and 2000 nm of a reflector according to the present invention is preferably higher than 90% or even higher than 95%, as for example 99%.

The metal foil may comprise any metal or metal alloy.

A preferred metal foil comprises a stainless steel foil.

The thickness of the metal foil is preferably ranging between 0.01 and 0.50 mm as for example 0.08 mm.

The first oxide layer is functioning as a diffusion barrier layer and is preventing the diffusion of the metal of the infrared reflecting layer in the substrate.

The second oxide layer is functioning as a protective layer for the infrared reflecting layer giving the infrared reflecting layer the required thermal stability.

The infrared reflecting layer may comprise any metal or metal alloy that has reflective properties.

Preferred infrared reflecting layers comprise for example gold, platinum, palladium, rhodium or alloys thereof.

Gold is preferred because of its reflective properties and its resistance to corrosion.

Preferably, the infrared reflecting layer has a thickness between 50 and 600 nm, as for example 300 nm.

The infrared reflecting layer can be deposited by any technique known in the art as for example sputtering, spraying, such as electrostatically spraying, evaporation such as thermal or e-beam evaporation, electroplating or chemical vapor deposition such as plasma enhanced chemical vapour deposition.

A preferred technique to deposit the infrared reflecting layer is by sputtering.

The first oxide layer may comprise any metal oxide. Preferred metal oxides comprises cerium oxide, aluminium oxide, beryllium oxide, chromium oxide, hafnium oxide, magnesium oxide, thorium oxide, yttrium oxide, manganese oxide, silicon oxide, zinc oxide or zirconium oxide or combinations thereof.

Most preferred oxides are cerium oxide and yttrium oxide.

Preferably, the first oxide layer has a thickness ranging between 50 and 500 nm, as for example 100 nm or 300 nm.

The second oxide layer may comprise any metal oxide. Preferred metal oxides comprise cerium oxide, aluminium oxide, beryllium oxide, chromium oxide, hafnium oxide, magnesium oxide, thorium oxide, yttrium oxide, manganese oxide, silicon oxide, zinc oxide or zirconium oxide.

Most preferred oxides are cerium oxide and yttrium oxide.

Preferably, the second oxide layer has a thickness ranging between 1 and 100 nm, as for example 5 nm, 10 nm or 30 nm.

The first oxide layer may comprise the same oxide as the second oxide layer or may comprise a different oxide.

The first and the second oxide layer can be deposited by any technique known in the art as for example sputtering such as reactive sputtering, by a dip coating process such as sol gel deposition, by a chemical vapor deposition such as pyrolytic chemical vapor deposition, combustion chemical vapor deposition or by evaporation such as reactive e-beam evaporation or reactive thermal evaporation.

A preferred technique to deposit the first and the second oxide layer is reactive sputtering.

According to a second aspect of the present invention a method to reduce the loss in total reflection in the wavelength range of 1000 to 2000 nm of an infrared reflecting layer of an infrared radiating element after thermal treatment to less than 15% compared to the total reflection before thermal treatment is provided.

The method comprises the steps of
- providing a metal foil;
- depositing a first oxide layer on the metal foil;
- depositing an infrared reflecting metal layer on the first oxide layer; and
- depositing a second oxide layer on the infrared reflecting layer.

More preferably, the loss in total reflection in the wavelength range of 1000 to 2000 nm after thermal treatment is lower than 10% or lower than 5%.

For the purpose of the invention, the thermal treatment comprises the exposure of the reflector to a temperature of 700° C. during 72 hours. It has to be understood that this thermal treatment constitutes a severe test as the working conditions of an infrared radiating element are usually around 250° C. and 300° C.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
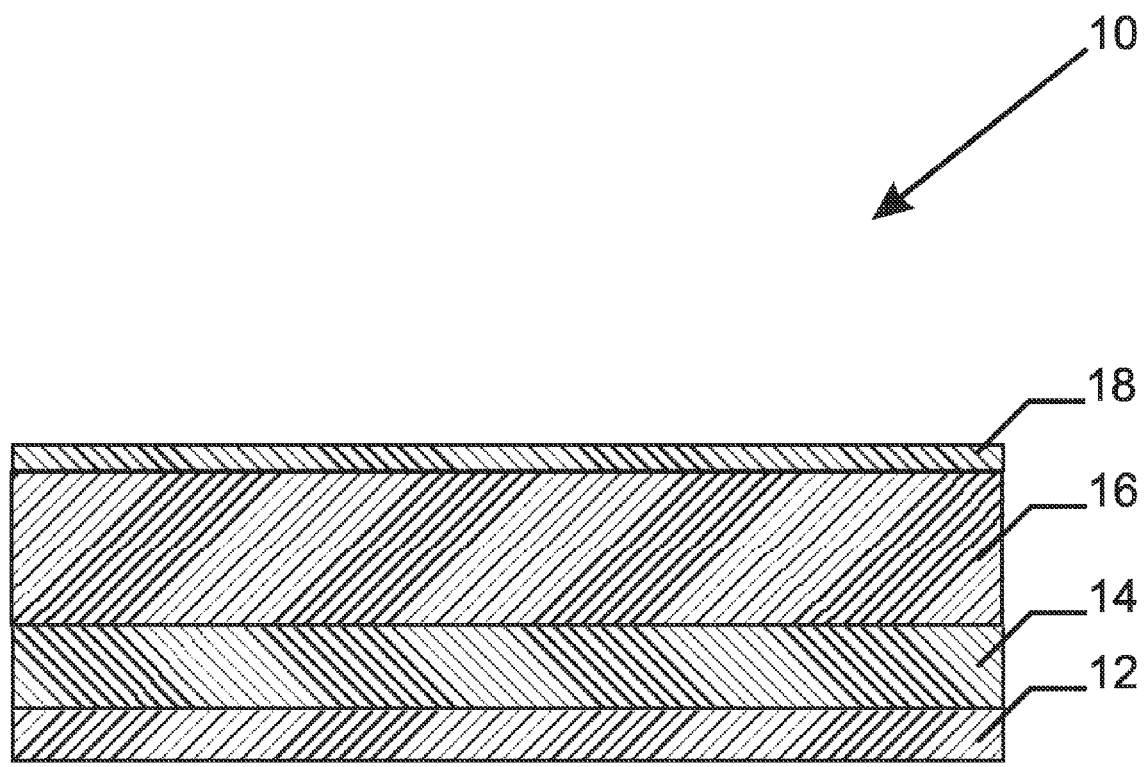
FIG. 1 is a schematic representation of a reflector according to the present invention.

The invention is illustrated by means of an example illustrated schematically in FIG. 1.

The reflector 10 comprises a stainless steel foil 12 having a thickness of 0.08 mm.

On the stainless steel foil a first oxide layer 14 comprising $CeO_x$ is deposited. The first oxide layer 14 is deposited by means of DC magnetron sputtering. The first oxide layer has a thickness of 160 nm. Subsequently, an infrared reflecting layer 16 comprising gold is deposited on the first oxide layer 14 by means of DC magnetron sputtering. The infrared reflecting layer 16 has a thickness of 350 nm. On the infrared reflecting layer 16 a second oxide layer 18 comprising $CeO_x$ is deposited by means of DC magnetron sputtering. The second oxide layer 18 has a thickness of 6 nm.

Another embodiment of a reflector according to the present invention comprises
- a stainless steel substrate;
- a first oxide layer comprising $Y_xO_y$ having a thickness of 160 nm;
- an infrared reflecting layer comprising Au having a thickness of 300 nm;
- a second oxide layer comprising $Y_xO_y$ having a thickness of 6 nm.

The two embodiments of reflectors are subjected to a thermal treatment under severe conditions. The reflectors are heated at a temperature of 700° C. during 72 hours.

The quality of the reflector is evaluated through visual inspection and by measuring the total reflection.

After the thermal treatment the gold coverage remains 100%.

Theoretical simulations of the two described embodiments show a total reflection in the wavelength range of 1000 to 2000 nm between 95% and 99%.

After the thermal treatment the decrease in total reflection in the wavelength range of 1000 to 2000 nm is lower than 15%. In some embodiments a decrease in total reflection in the wavelength range of 1000 to 2000 nm of less than 5% is obtained.

The invention claimed is:

1. A reflector for an infrared radiating element, said reflector comprising:
   a metal foil coated with a first oxide layer deposited on said metal foil, wherein the metal foil has a thickness of 0.01 to 0.5 mm,
   an infrared reflecting metal layer deposited on said first oxide layer, and
   a second oxide layer deposited on said infrared reflecting metal layer,
   wherein the metal foil is a substrate for the oxide layers and the metal layer.

2. A reflector according to claim 1, wherein said infrared radiating element comprises an infrared lamp or an infrared heater.

3. A reflector according to claim 1, wherein said reflector has a total reflection in the wavelength range of 1000 to 2000 nm of at least 90%.

4. A reflector according to claim 1, wherein said metal foil comprises a stainless steel foil.

5. A reflector according to claim 1, wherein said infrared reflecting metal comprises gold, platinum, palladium, rhodium or alloys thereof.

6. A reflector according to claim 1, wherein said first oxide layer is selected from the group consisting of cerium oxide, aluminium oxide, beryllium oxide, chromium oxide, hafnium oxide, magnesium oxide; thorium oxide, yttrium oxide, manganese oxide, silicon oxide, zinc oxide or zirconium oxide or combinations thereof.

7. A reflector according to claim 1, wherein said second oxide layer is selected from the group consisting of cerium oxide, aluminium oxide, beryllium oxide, chromium oxide, hafnium oxide, magnesium oxide, thorium oxide, yttrium oxide, manganese oxide, silicon oxide, zinc oxide or zirconium oxide or combinations thereof.

8. A reflector according to claim 1, wherein said infrared reflecting metal layer has a thickness between 50 and 600 nm.

9. A reflector according to claim 1, wherein said first oxide layer has a thickness between 50 and 500 nm.

10. A reflector according to claim 1, wherein said second oxide layer has a thickness between 1 and 100 nm.

11. A method to reduce the loss in total reflection in the wavelength range of 1000 to 2000 nm of an infrared reflecting layer of an infrared radiating element after a thermal treatment to less than 15% compared to the total reflection in the wavelength range of 1000 to 2000 nm before thermal treatment, wherein said thermal treatment comprises the exposure to a temperature of 700° C. during 72 hours, said method comprising the steps of:
   providing a metal foil, wherein the metal foil has a thickness of 0.01 to 0.5 mm;
   depositing a first oxide layer on said metal foil;
   depositing an infrared reflecting metal layer on said first oxide layer; and
   depositing a second oxide layer on said infrared reflecting metal layer;
   wherein the metal foil is provided as a substrate for the oxide layers and the metal layer.

12. A method according to claim 11, wherein the loss in total reflection in the wavelength range of 1000 to 2000 nm after said thermal treatment is less than 5%.

13. A method according to claim 11, wherein said infrared radiating element comprises an infrared lamp or an infrared heater.

14. A method according to claim 11, wherein said metal foil comprises a stainless steel foil.

15. A method according to claim 11, wherein said infrared reflecting metal comprises gold, platinum, palladium, rhodium or alloys thereof.

16. A method according to claim 11, wherein said first oxide layer is selected from the group consisting of cerium oxide, aluminium oxide, beryllium oxide, chromium oxide, hafnium oxide, magnesium oxide, thorium oxide, yttrium oxide, manganese oxide, silicon oxide, zinc oxide or zirconium oxide or combinations thereof.

17. A method according to claim 11, wherein said second oxide layer is selected from the group consisting of cerium oxide, aluminium oxide, beryllium oxide, chromium oxide, hafnium oxide, magnesium oxide, thorium oxide, yttrium oxide, manganese oxide, silicon oxide, zinc oxide or zirconium oxide or combinations thereof.

18. A method according to claim 11, wherein said infrared reflecting layer has a thickness between 50 and 600 nm.

19. A method according to claim 11, wherein said first oxide layer has a thickness between 50 and 300 nm.

20. A method according to claim 11, wherein said second oxide layer has a thickness between 1 and 100 nm.

* * * * *